UNITED STATES PATENT OFFICE.

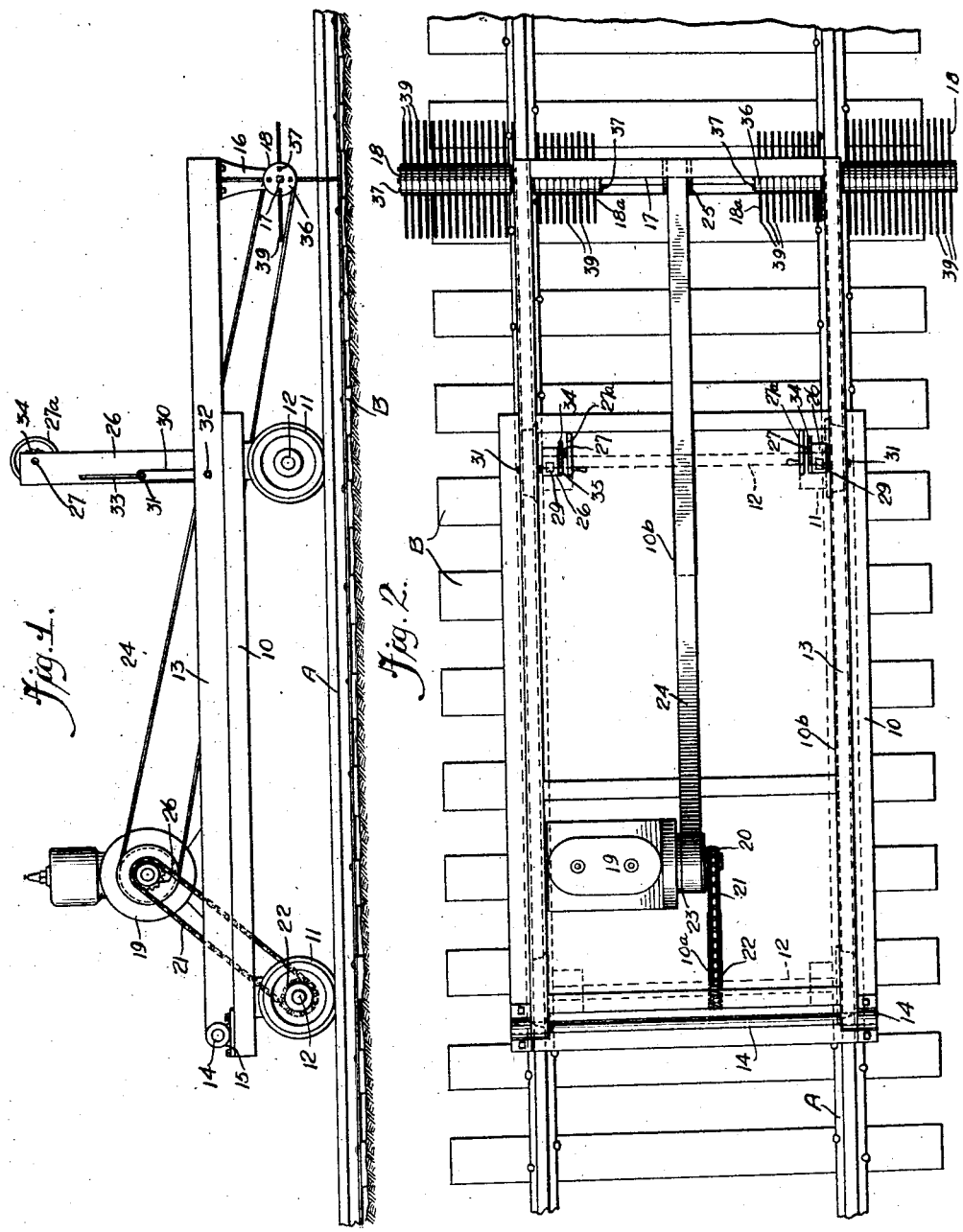

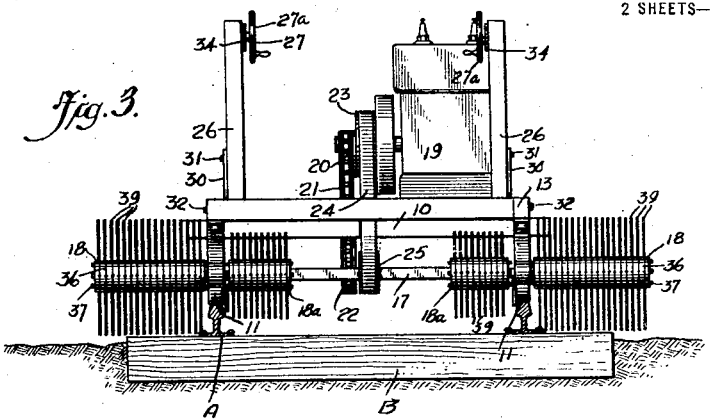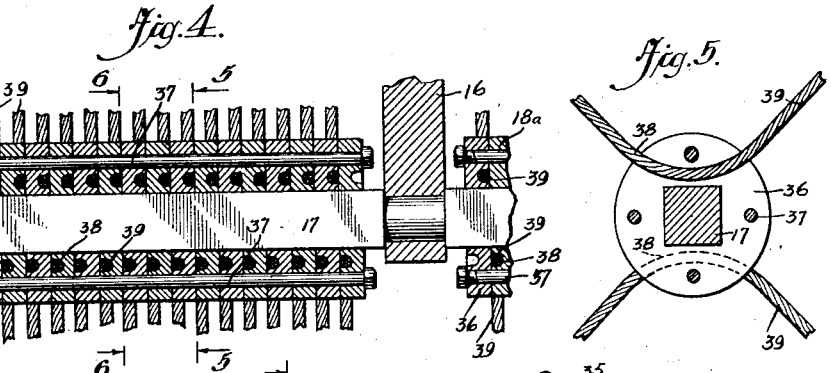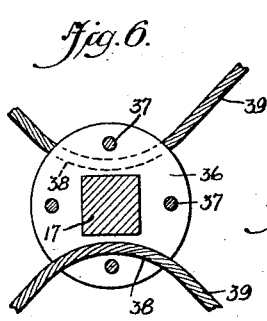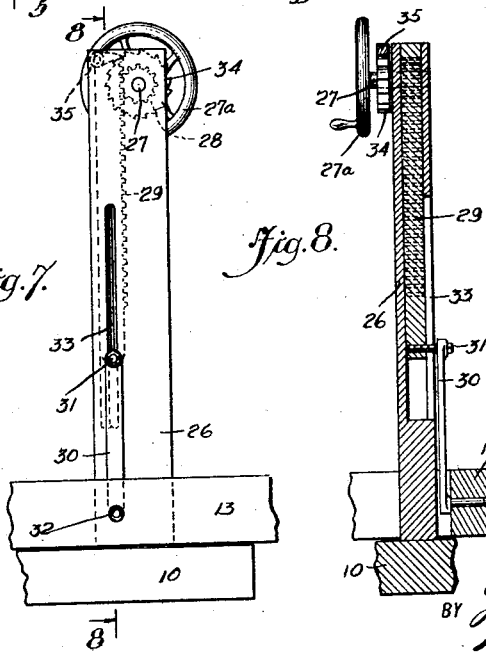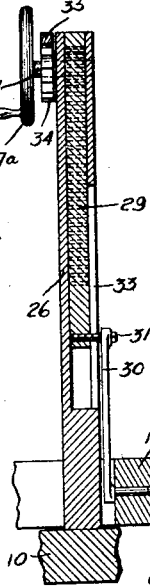

THOMAS WILLIAM KELLY AND CLAUDE TINGLE, OF BELTON, TEXAS.

WEED AND GRASS CUTTER FOR RAILWAYS.

1,409,011.  Specification of Letters Patent.  Patented Mar. 7, 1922.

Application filed June 28, 1921. Serial No. 480,988.

*To all whom it may concern:*

Be it known that we, THOMAS WILLIAM KELLY and CLAUDE TINGLE, citizens of the United States, and residents of Belton, in the county of Bell and State of Texas, have invented a new and Improved Weed and Grass Cutter for Railways, of which the following is a full, clear, and exact description.

Our invention relates to a weed and grass cutter adapted to travel on a railway track and having a driven cutter. The general object of the invention is to provide a cutter of the indicated class in which the cutting element of the driven cutter will be flexible to remove weeds and grass by a brushing action.

A further object is to utilize lengths of cable as the cutting elements and to provide an effective assemblage of said elements as well as means to firmly clamp the elements.

The invention also has for an object to provide a novel raising or lowering means for the driven cutter, to raise either end thereof, or both ends.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of a weed and grass cutter embodying our invention, showing the same arranged to run on a railway track.

Figure 2 is a plan view thereof.

Figure 3 is a front elevation.

Figure 4 is an enlarged fragmentary view showing in longitudinal vertical section the construction of the revoluble cutter brush.

Figures 5 and 6 are vertical sections on the lines 5—5 and 6—6 of Figure 4.

Figure 7 is a detail in side elevation of the means for lowering and raising the brush frame, and Figure 8 is a vertical section on the line 8—8 of Figure 7.

In carrying out our invention in accordance with the illustrated example, a main frame 10 is provided having wheels 11 mounted on the axles 12 adapted to run on the rails A of a railway track. On the frame 10 is mounted a second frame 13 pivoted at one end to the frame 10 by a transverse shaft 14 turning in bearings 15 on the main frame.

On the frame 13, at the opposite end from the pivot shaft 14 are depending hanger bearings 16, in which the brush shaft 17 turns, said shaft having brushes 18 at the ends and outside of the frame to be disposed outside of the track rails and additional brushes 18$^a$ in position to be disposed between the track rails. Said brushes have cutting elements as hereinafter described. We would mention that in practice, brush shafts of different lengths are provided and substituted one for the other according to whether the cutter is to remove weeds and grass from the area of the ties B and the rails, or to operate laterally of the ties.

A suitable motor 19 is provided on the frame 10 adapted to propel the apparatus along the track and to drive the revoluble cutter brush in the form shown, a sprocket pinion 20 is provided on the motor shaft, over which a belt 21 runs, said belt running also over a sprocket pinion 22 on the rear axle 12 for propelling the apparatus along the track. The belt 21 passes through an opening 10$^a$ in the closed bottom of main frame 10. To drive the brush shaft 17, a pulley 23 is provided on the engine shaft, over which a belt 24 runs, said belt running about a sheave 25 on the brush shaft 17. The lower run of the belt passes through an opening 10$^b$ formed in the closed bottom of frame 10.

In order to raise or lower the frame 13 and thereby lower the brush shaft, I provide a raising and lowering means associated with each side of said frame. In the preferred form of the invention, a standard 26 rises from the frame 10 adjacent to the front end near each side, and at the upper end thereof is mounted a transverse shaft 27 having a wheel 27$^a$ or other means for turning it, on which shaft is a pinion 28 meshing with a vertical rack 29 having guided vertical movement in the standard 26. To the lower end of the rack 29 a link 30 is secured by a transverse screw or bolt 31, the lower end of said link arm being secured by a pin or bolt 32 to the brush frame 13. Thus, the turning of the shaft 27 will serve to raise or lower the rack 29 and through the link 30 raise or lower the frame 13 and the brush shaft 17, separate raising and lowering means being provided at each side of the frame 13, that either end of the brush may be lowered, or both ends. On the shaft 27 is a ratchet wheel 34 engaged by a pawl 35 to hold the parts with the brush shaft in given adjustment.

The revoluble cutter brushes 18 and 18ª are each composed of a series of disks 36, the several disks in a given brush being clamped by clamp bolts 37 extending through the said disks. In the faces of the disks 36 are grooves 38, advantageously arcuate, in which grooves are received lengths of cable 39 which project radially, or approximately so, beyond the disks to constitute flexible cutting elements. The groove 38 in one face of the disk 36 is at the opposite side of the shaft 17 from the groove in the other face.

With the described arrangement, the cutting element 39 will remove the weeds and grass with a brushing action and the great flexibility of said cutting elements permits of the brush being operated successfully over rough and uneven surfaces, as the cutting elements are not injured by contact with the ties or with rocks or other obstructions in the area over which the brush operates.

We would state in conclusion that while the illustrated example constitutes a practical embodiment of our invention, we do not limit ourselves strictly to the mechanical details herein illustrated, since manifestly the same can be considerably varied without departing from the spirit of the invention as defined in the appended claims.

Having thus described our invention, we claim:

1. A grass and weed cutter, including a frame adapted to be propelled and a revoluble brush thereon having cutting elements formed of lengths of cable.

2. A grass and weed cutter, including a frame adapted to be propelled and a driven cutter brush thereon, said brush comprising disks, clamping means for the disks and cutting elements between the disks and extending beyond the same, said elements being composed of lengths of cable.

3. A revoluble cutter brush for grass and weeds comprising disks having facial grooves therein, lengths of cable held in said grooves and extending beyond the disks to constitute cutting elements and clamping means for the assembled disks and cutting elements.

4. A revoluble cutter brush for weeds and grass comprising disks having a groove in each face thereof, the grooves in the respective faces being at opposite sides of the axis of the brush and lengths of cable constituting cutting elements and engaging the disks in said grooves.

5. A revoluble cutter brush for grass and weeds comprising disks having arcuate facial grooves therein, lengths of cable in said grooves and extending at their ends beyond the disks to constitute cutting elements and clamping means for the disks.

6. A grass and weed cutter for railways comprising a wheeled main frame, a second frame pivotally mounted at one end on the main frame to be raised or lowered, a cutter mounted on the second frame adjacent to the opposite end from the pivot and separate raising and lowering means associated with each side of the second frame to raise or lower either or both ends of the cutter shaft.

THOMAS WILLIAM KELLY.
CLAUDE TINGLE.